United States Patent [19]

Kristen et al.

[11] Patent Number: 5,258,736

[45] Date of Patent: Nov. 2, 1993

[54] TEMPERATURE SENSOR OR TEMPERATURE SENSOR ARRANGEMENT MADE FROM GLASS CERAMIC AND BONDING FILM RESISTORS

[75] Inventors: Klaus Kristen, Wiesbaden; Herwig Scheidler, Mainz, both of Fed. Rep. of Germany

[73] Assignee: Schott Glaswerke, Mainz, Fed. Rep. of Germany

[21] Appl. No.: 731,774

[22] Filed: Jul. 18, 1991

[30] Foreign Application Priority Data

Jul. 18, 1990 [DE] Fed. Rep. of Germany ....... 4022845

[51] Int. Cl.$^5$ ............................................. H01C 7/10
[52] U.S. Cl. ..................... 338/22 R; 338/23; 338/24; 338/314; 219/449; 219/505; 374/185
[58] Field of Search .................. 338/23, 24, 25, 22 R, 338/22 SD, 260, 297, 314; 219/449, 448, 450, 505, 494, 510, 464; 374/185, 205

[56] References Cited

U.S. PATENT DOCUMENTS

| | | | |
|---|---|---|---|
| 4,763,099 | 8/1988 | Balderson | 338/22 R |
| 4,772,779 | 9/1988 | Scheidler et al. | 219/448 |
| 4,973,826 | 11/1990 | Baudry et al. | 219/464 |
| 5,041,809 | 8/1991 | Payne et al. | 338/25 |

FOREIGN PATENT DOCUMENTS

| | | |
|---|---|---|
| 0147056 | 7/1985 | European Pat. Off. |
| 2139828 | 8/1971 | Fed. Rep. of Germany |
| 2145301 | 9/1971 | Fed. Rep. of Germany |
| 2210651 | 3/1972 | Fed. Rep. of Germany |
| 3705260 | 2/1987 | Fed. Rep. of Germany |
| 3705261 | 2/1987 | Fed. Rep. of Germany |
| 3744372 | 12/1987 | Fed. Rep. of Germany |
| 3744373 | 12/1987 | Fed. Rep. of Germany |
| 2600329 | 4/1981 | United Kingdom |
| 2138659 | 10/1984 | United Kingdom |

*Primary Examiner*—Marvin M. Lateef
*Attorney, Agent, or Firm*—Millen, White, Zelano & Branigan

[57] ABSTRACT

Temperature sensors or temperature sensor arrangements made from glass ceramic and bonding film resistors, suitable especially for control and limitation of output in glass ceramic cooking areas, are distinguished in that thin- and/or thick-film resistors are baked on supports of glass ceramic, for example, in the area of the cooking zone of a glass ceramic cooking surface, and one or more glass ceramic resistances are delimited and bonded there, and the film resistors form parallel and-/or iterative circuits with the glass ceramic resistances. By suitable selection of the dimensions as well as the surface resistances and temperature coefficients of the bonding film resistors and the type of sensor circuit (parallel and/or iterative circuit), the temperature resistance characteristic of a sensor circuit can be varied within wide limits, e.g., the temperature area of use of a glass ceramic sensor can be considerably expanded toward low temperatures. The geometric shape of a sensor arrangement can be matched to the specified temperature distribution of a surface to be monitored, for example, a glass ceramic cooking surface in the area of the cooking zones, so that practically all areas of the heated surface essential for the temperature control and limitation are detected.

28 Claims, 6 Drawing Sheets

TEMPERATURE SENSOR OR TEMPERATURE SENSOR ARRANGEMENT MADE FROM GLASS CERAMIC AND BONDING FILM RESISTORS

BACKGROUND OF THE INVENTION

The invention relates to temperature sensors or temperature sensor arrangements made from glass ceramic and bonding film resistors, which are suitable especially for control and limitation of output in glass ceramic cooking areas.

The use of glass ceramics as temperature sensors is already known from DE-PS 21 39 828. In this publication, especially a temperature-measuring resistor made from a glass ceramic of the $SiO_2$-$Al_2O_3$-$Li_2O$ system is described. This glass ceramic is distinguished by a high resistance to thermal shocks because its very low thermal expansion, $\alpha$, is less than or equal to $1.5 \cdot 10^{-6}$/K, and is therefore suitable especially for use as a measuring probe in very hot industrial furnaces, waste gas chambers, etc.

To monitor temperatures of large surfaces, a sensor is described in the publication which is distinguished in that strip-like glass ceramic areas are delimited and bonded on glass ceramic supports made flat with strip conductors made from Au, Pt or Ag, whose electrical resistance is used as a temperature-measuring resistor According to the publication, the total resistance of this arrangement can be considered to consist of a multiplicity of differential resistor elements connected in parallel, and the least resistance occurs where the surface is heated the most. The low heat conduction of the glass ceramic prevents a quick equalization of temperature of the overheated point with the environment. The total resistance of this arrangement is determined by the resistance of the hottest point of the surface, until the temperature equalization has taken place. Local overheating thus produces short-term, extreme resistance changes of the temperature-measuring resistor, which can be used according to the publication, for example, to control an overheating safety device.

U.S. Pat. No. 4,237,368 describes a use of the above-described sensors for monitoring the temperature of cooking zones in glass ceramic cooking surfaces with the help of electric comparators. For this purpose, strip-like glass ceramic areas, which run along a diameter of the cooking zones, are delimited and bonded as temperature sensors in the cooking zones with two parallel strip conductors each made from gold. The bonded strip conductors are bridged with a shunt resistor connected in parallel on their outermost ends, which achieve a thermoelement safeguarding against breakage in cold cooking zones. One each of the two strip conductors of the temperature sensors is connected to a strip conductor, which goes around the entire cooking surface along its periphery and acts as a broken glass sensor.

DE-OS 37 44 373 A 1 describes an electronic power control arrangement and process for a glass ceramic cooking area, which uses sensors to determine temperatures according to the above-described arrangement of U.S. Pat. No. 4,237,368. The heat output given off respectively in the cooking zones is controlled in this case as a function of the glass ceramic temperature and its rate of change. For this purpose, the strip-like glass ceramic resistances delimited in the cooking zones by parallel gold strip conductors deliver the necessary temperature signals because of their change of resistance with the temperature.

An improved output control and monitoring arrangement for glass ceramic cooking areas, which in principle corresponds to the arrangement of the above-described type relative to the temperature sensor arrangements in the cooking zones, is also known from DE-OS 37 44 372.

The specific resistance of all known glass ceramics, which are used as cooking surfaces, at 20° C. is on the order of magnitude of $10^{13}$ $\Omega \cdot$ cm to $10^{15}$ $\cdot \Omega$ cm and reaches values between $10^7$ $\Omega \cdot$ cm to $10^9$ $\Omega \cdot$ cm. at temperatures around 200° C. Independently of the respective sensor geometry, the temperature-measuring signal—or sensor current or the voltage drop on a measuring resistor with the sensor connected in series—thus is changed in said temperature range by 6 powers of ten. For evaluation and further processing of these temperature-measuring signals, expensive electronic precision instruments, which are equipped with measuring range switches and/or logarithmic amplifiers, are necessary, which cannot be used in kitchen ranges. This is aggravated by the fact that the large-area and very high-ohmic sensors, which are placed in direct proximity with the heating coils or cooking zone heating, are sensitive to capacitively or inductively interspersed spurious signals for whose removal an additional electronic expenditure has to be made.

Because of the described problems, all glass ceramic temperature sensors, described in the "prior art," for control and adjustment of the cooking zone temperature of glass ceramic cooking surfaces are not suitable in the temperature range below 200° C. This is a considerable drawback, since to keep hot, to melt fats and in many other uses of glass ceramic cooking areas, the exact observance of cooking zone temperatures below 200° C. is necessary and of great importance for the user.

Another drawback of the sensors known from the above-mentioned publications is that they are placed respectively only along a diameter or half diameter in the cooking zones and because of the already mentioned low heat conduction of the glass ceramic, it is on the order of magnitude of 2 to 3 W/mK; (watts/milliKelvin only the temperatures in these linear partial areas of the cooking zones can be detected. Thus, neither is a sufficient overheating protection of the total cooking zone assured nor is the temperature signal, supplied by the linear partial areas, relative to the actual heat flow to the entire pot bottom assured, so that the heating devices with the sensors of the above-mentioned publications are controlled by a temperature signal, which does not correspond to the temporary removal of heat from the entire cooking zone.

Further protective temperature limitation devices are known (e.g., according to DE-PS 37 05 260.8 or DE-PS 37 05 261.6), which are placed as separate component at a short distance below the cooking zones from the glass ceramic cooking surfaces along a diameter of the cooking zones. They are heated both by the radiant heating element contained below them and by the radiation from the underside of the cooking surfaces. They consist of a metal rod, with great thermal expansion, which is placed in a pipe made from a material with low thermal expansion. A spring-controlled switch is actuated when a specified temperature is reached because of the relative thermal expansion between the metal rod and the pipe. This leads to energy timing of the heating element within a narrow temperature range, which is determined by the switching hysteresis of the spring-controlled switch.

The temperature limitation device responds to the integral temperature of the heating element/cooking surface system. The radiant heating on the side of the cooking surface imparts the input to the superposed pot.

A drawback of this limitation device arrangement is that, here also, the heating on the cooking surface side of the limiting rod primarily is the result of the radiation of the linear diameter area of the cooking zone placed directly over it. If much heat is removed by a superposed pot from this diameter zone, for example, in the edge area, the limitation device remains colder there than in its central area. The limiting rod thus undergoes an apparent shortening, since for the switching, now basically only the hotter central area is active. Thus, in the case of constant switching characteristics, the switching point, consequently also the limiting temperature, is raised. By uneven radiant heating on the side of the cooking surface, the level of the limiting temperature thus is influenced in proportion to the respective "active limiting rod length" coming into effect. In unfavorable cases, this can result in overheating of the cooking zones.

SUMMARY OF THE INVENTION

An object of the invention is to provide a temperature sensor or temperature sensor arrangement of the initially mentioned type, whose temperature range of use toward lower temperatures is expanded far beyond the area of use of the usual glass ceramic temperature sensors, and which further, in contrast to the known sensors, allows for reliable monitoring of the temperature of the entire heated surface, e.g, in the cooking zone of a glass ceramic cooking surface. Especially, the sensor is to be usable as a measuring probe for control and limitation of output in glass ceramic cooking areas.

Upon further study of the specification and appended claims, further objects and advantages of this invention will become apparent to those skilled in the art.

According to the invention, one or more glass ceramic resistances are delimited and bonded with thin- and/or thick-film resistors on surfaces or special supports made from glass ceramic. The glass ceramic resistances together with the film resistors, formed as temperature-measuring resistors, form parallel and/or iterative circuits, which form the temperature sensors, whose temperature resistance characteristic is determined by the superposition of the temperature resistance characteristics of the individual resistances, by the resistance values of the individual resistances as well as by their geometry and circuit.

A parallel circuit is formed, in this case, by a thin- or thick-film resistor provided on its two ends with electric connecting contacts. The film resistor is shunted with increasing temperature by the resistance of the glass ceramic, which is placed under and along the film resistor.

Two opposite, i.e. basically parallel thin- and/or thick-film resistors, which are each provided with electric connecting contacts only on one end, form—together with the glass ceramic resistance placed between the film resistors, which can be viewed as a multiplicity of resistance cells located next to one another—an iterative circuit. From the sensors known from the prior art, which exhibit a similar design, an iterative circuit according to the invention is distinguished in that the surface resistance of the film resistors bonding the resistance cells cannot be disregarded as assumed in the known sensors. The surface resistances according to the invention in the above-described arrangement are on the order of magnitude of 1 m$\Omega$ to 1,000 $\Omega/\square$.

The electrical resistance of all glass ceramics now known decreases exponentially with increasing temperature. The law of Rasch and Hinrichsen applies:

$$Lg\nu = A + \frac{B}{T}$$

in which $\phi$ means the specific resistance, A and B material-specific constants and T means the absolute temperature. As an example, FIG. 1 shows the course of the specific resistance of a preferred glass ceramic for use as cooking surfaces made from the $SiO_2$-$Al_2O_3$-$Li_2O$ system with constants A$=-1.922$ and B$=4,561.6$ as a function of the temperature.

According to the invention, glass ceramics are preferred as support materials because of their low thermal expansion and their resistance to thermal shocks. However, the invention is by no means limited to the use of glass ceramics. The sensors or sensor arrangements can also be applied to supports made from comparable materials, such as, for example, glass or ceramic.

For the bonding thin- or thick-film resistors designed as temperature-measuring resistors, suitably materials are selected with positive temperature coefficients of the electrical resistance and thus resistances increasing linearly with the temperature. In special cases, the bonding thick-film resistors especially can also be produced from materials whose course of resistance with the temperature exhibits a PTC or NTC character.

As materials for the thin-film resistors, resonates of metals and metal alloys Au, Ag, Pt, Pd, Au/Ag, Au/Pt, Ag/Pd as well as Au/Pt/Pd, which can be used up to temperatures of 800° C. and exhibit a good stability of the electrical resistance and temperature coefficients of the electrical resistance, have proven reliable.

Also, thick-film resistors made from said materials can be used at similarly good temperature stability of the resistances and temperature coefficient of the electrical resistance, but at mostly lower temperatures of use.

High-ohmic bonding film resistors are suitably designed as thick-film resistors made from metal oxide materials such as $RuO_2$, $Rh_2O_3$, $IrO_2$, $OsO_2$, $TiO_2$, which also exhibit a positive temperature coefficient.

All these materials are applied in silk-screen printing on the glass ceramic support in a way known in the art and baked there at temperatures between 500° and 1000° C.

For production reasons, the bonding film resistors of a sensor circuit or all sensor circuits consist of a support preferably made from the same material and are designed either all as thin-film resistors or all as thick-film resistors. But it is just as possible, although more expensive, to design the individual film resistors individually for specific applications.

The connecting areas of the film resistors are preferably reinforced with silver layers or Ag/Pd or Au, Au/Pt/Pd. They support suitable contacts, which are attached with continuous elastic, electrically conducting adhesives based on silicone rubbers or epoxy resins or with tin solder or tin/indium solder.

The advantages achievable with the invention lie especially in the fact that by suitable selection of the length and width and layer thickness as well as the surface resistances and temperature coefficients of the bonding thin- and/or thick-film resistors, the temperature coefficients and the geometry of the glass ceramic resistances and the type of the sensor circuit (parallel and/or iterative circuit), the temperature resistance characteristic of a sensor circuit according to the invention varies in wide limits and can be matched to the respective measuring problem or the requirements of the controlling and delimiting electronic equipment downstream from the sensor.

The geometric configuration and expansion of the sensor circuits over the surfaces, whose temperature is to be controlled and/or monitored, are subject to practically no limitations so that all essential areas of a heated surface can be detected.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 2A:
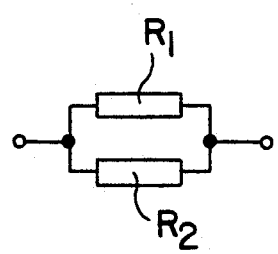
FIGS. 2a and 2b, a strip-like film resistor on a glass ceramic support, which forms a parallel circuit diagram with the surrounding glass ceramic, as well as an equivalent circuit diagram for this arrangement.
Figure 2B:
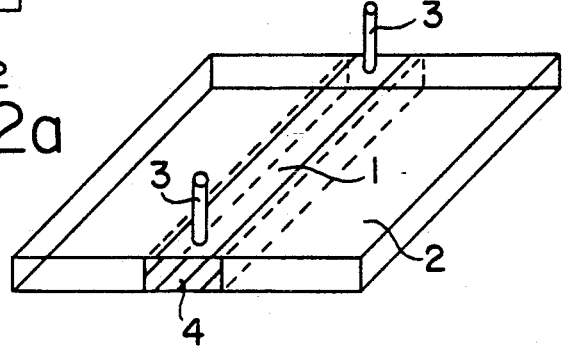

FIG. 2 shows, as an example for a parallel circuit according to the invention, a sensor which consists of a strip-like thin- or thick-film resistor 1, which is baked on a support surface 2 made from glass ceramic and is provided on its ends with electric connecting contacts 3 as well as an equivalent circuit of this sensor. Film resistor $R_1$ and electrical resistance $R_2$, which is made from glass ceramic 4, which is placed under the film resistor and along its edges, are connected in parallel. The total resistance of this sensor circuit is:

$$\textcircled{R} \text{Sensor} = \frac{R_1 \cdot R_2}{R_1 + R_2}$$

If this parallel circuit is imagined to be divided into individual, differential "cells," the resistances of these cells are connected in a series. Thus, a sensor resistance is adjusted at various temperatures along the resistance strip, which is proportional to the average temperature of the sensor line. Individual hot spots are "averaged" by this sensor.

To control the temperature, for example, in the surface of the cooking zone of a glass ceramic cooking area, it can be advisable to design the film resistor so that the temperature resistance characteristic of the sensor is determined basically solely by the film resistor. This can be achieved in a simple way in that a material with low surface resistance, preferably with a positive temperature coefficient of the electrical resistance, is selected for the film resistor and its dimensions are configured in such a way that the film resistor is clearly smaller, at the maximum temperature of use of the sensor, than the electrical resistance of the surrounding glass ceramic connected in parallel.

Figure 3:
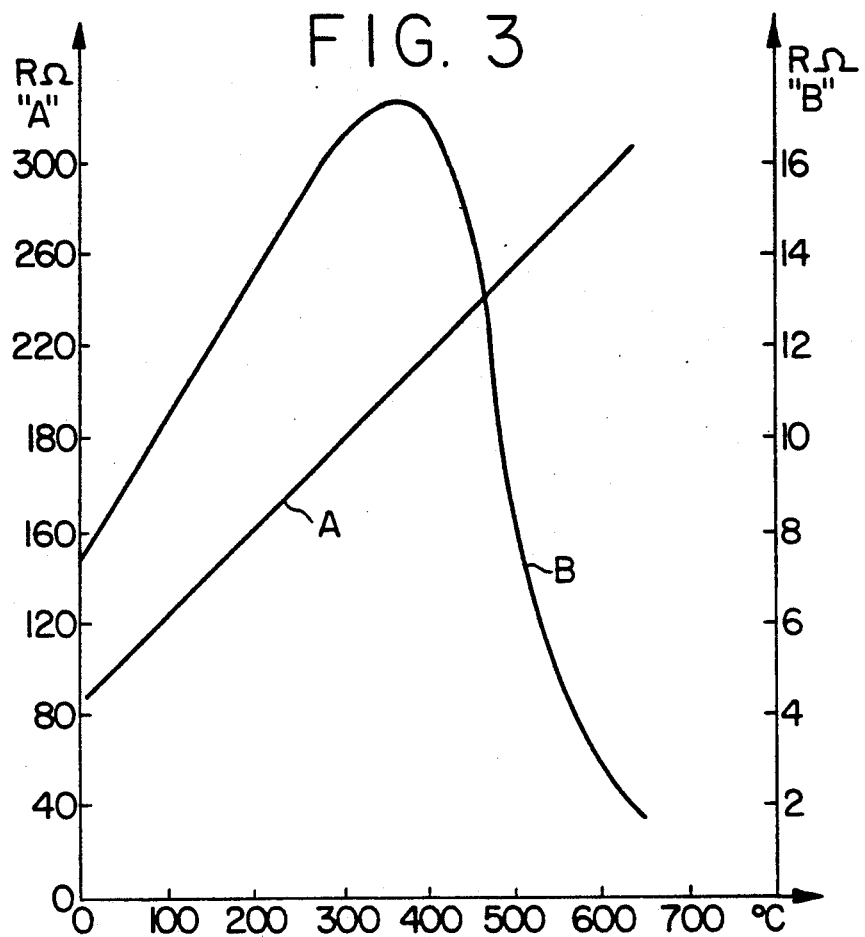
FIG. 3, the temperature resistance characteristics of two sensors according to FIG. 2, which are distinguished relative to the design of the individual resistor.

FIG. 3 shows characteristic "A" of such a sensor, which consists of a film resistor with the dimensions $160 \times 10$ mm$^2$ with a surface resistance of 0.3 $\Omega/\square$, which is baked on a 1 mm thick, 160 mm long and 10 mm wide glass ceramic support. FIG. I shows the dependence on temperature of the specific resistance of the glass ceramic support. The sensor was heated as a whole to the respective temperatures according to the temperature scale of FIG. 3 (the resistance scale on the right side of the figure) applies.

With the help of a correspondingly designed sensor, the average temperature of a glass ceramic cooking surface can be shown and controlled exactly in the area of a cooking zone, beginning from room temperature.

The sensor can be integrated in a simple way in the cooking surface of a glass ceramic cooking surface. For this purpose, the film resistor in the area of a cooking zone is baked on the glass ceramic cooking surface. To eliminate local overheating, the strip-like film resistor is, in this case, advantageously run over the cooking surface, so that as much as possible all essential areas, relative to the temperature exposure, of the heated surface are detected. Especially, the geometric shape of the film resistor can be matched to the expected temperature distribution in the surface of the cooking zone in practical operation, which is determined essentially by the type of heating as well as the geometric shape and the arrangement of the heating source and by the application surface of the superposed pots.

To keep the obstruction of the heat flow from the heating source to the cooking surface low, the total surface of the strip conductors in the area of a cooking zone in all sensors according to the invention should constitute at most 10% of the total surface of the cooking zone.

Figure 4:
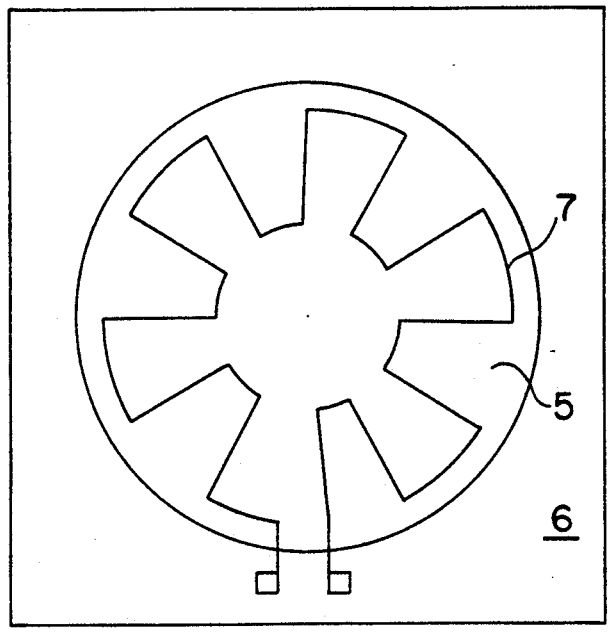
FIG. 4, a temperature sensor according to FIG. 2 in the surface of cooking zone of a glass ceramic cooking surface designed as a star with several circular sectors.

FIG. 4 shows a preferred geometric arrangement for a temperature sensor according to the invention. The sensor is designed as a star 7 with several circular sectors in the area of cooking zone 5 of a glass ceramic cooking area 6 of a cooktop stove. This sensor detects the essential partial areas of the cooking zone and thus offers a sufficient overheating protection for the entire heated surface, which cannot be achieved with the known linear temperature sensors from the prior art. The average temperature of the cooking zone can, for example, as a function of the temporary removal of heat by a superposed pot, be shown and controlled exactly.

If a material with great surface resistance and advantageously with a positive temperature coefficient of the resistance is selected for the film resistor (depending on the application, film resistors with nonlinear temperature resistance characteristics can also be more suitable), and if its geometry is made so that the film resistor at a temperature within the temperature area of use, for example at about 480° C., corresponds to the resistance of the glass ceramic, a temperature sensor with a temperature resistance characteristic results which consists of a branch exponentially decreasing at high temperatures and linearly increasing at low temperatures, as is represented with curve "B" in FIG. 3. The data from this temperature sensor is:

| Thin- or thick film resistor: | Length | 160 mm |
|---|---|---|
| | Width | 10 mm |
| | Surface resistance | 10 Ω/□ |
| Glass ceramic support and resistance: | Length | 160 mm |
| | Width | 10 mm |
| | Thickness | 5 mm |

Figure 1:
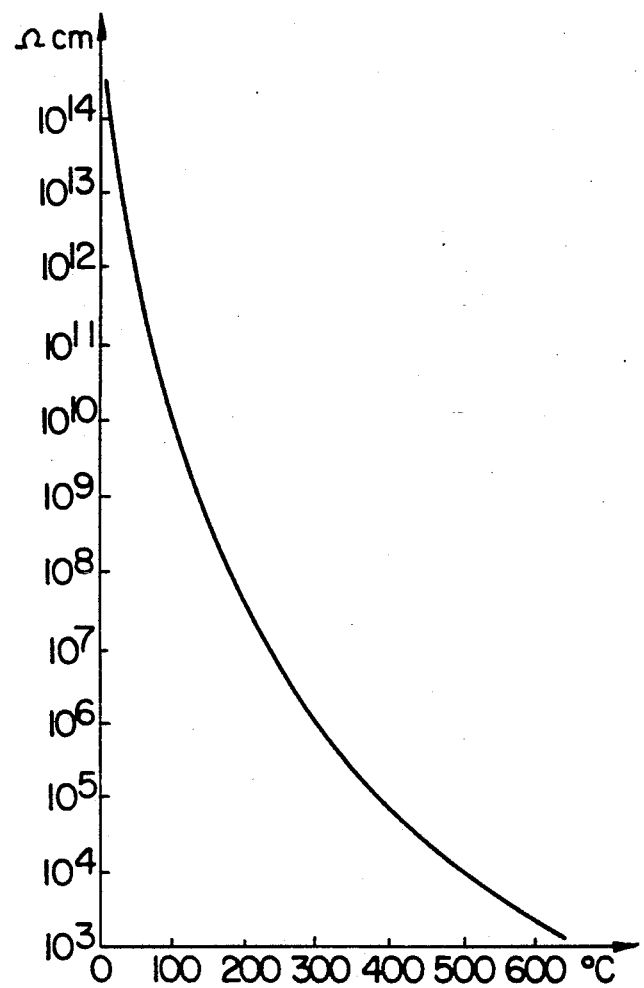
FIG. 1, the course of the specific resistance of a glass ceramic from the $SiO_2$-$Al_2O_3$-$Li_2O$ system with the temperature.

Dependence on temperature of the specific resistance according to FIG. 1.

The linear rise of resistance characteristic "B" with the temperature is identical to the increase of the film resistor, which is shunted with increasing temperature to an increasing extent by the resistance of the surrounding glass ceramic. Its resistance decreasing exponentially with the temperature is first emphasized at higher temperatures (from about 349° C. in the figure).

In the area of a cooking zone integrated in a glass ceramic cooking surface, e.g., analogously to the above-described embodiment as a star with several circular sectors, this sensor can be used advantageously for temperature control of the cooking zones at low cooking surface temperatures, and the part of the temperature resistance characteristic steeply decreasing with the temperature at high temperatures offers ideal conditions for an effective temperature limitation with small switching hysteresis. The position of the reversal point of the temperature resistance characteristic within the temperature area of use of the sensor is determined by the size of the surface resistance and the geometric dimensions of the film resistor. Also, this temperature sensor reacts basically to the average temperature of the monitored heating surface.

Figure 5:
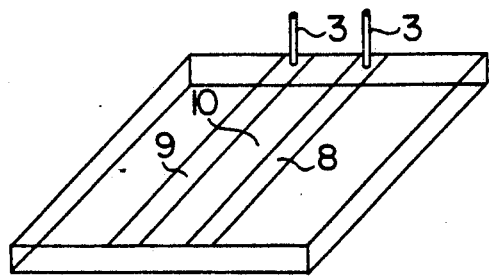
FIG. 5, as an example for an iterative network, two parallel thin- and/or thick-film resistors, which delimit a strip-like glass ceramic resistance.
Figure 6:
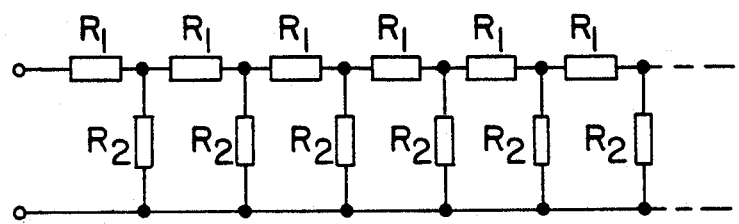
FIG. 6, the equivalent circuit diagram for the arrangement of FIG. 5.

FIG. 5 shows, in the simplest embodiment, an iterative network according to the invention, which is formed by two parallel thin- and/or thick-film resistors 8 and 9 and intervening glass ceramic 10. FIG. 6 shows the equivalent circuit of the iterative network. In this equivalent circuit, resistances $R_1$ and $R_2$ represent the partial circuit of a differential "resistance cell" of the sensor designed as an iterative network. $R_1$ is the cumulative resistance, which consists of the series connection of the two partial sections of the bonding thin- and/or thick-film resistors, which are allocated to the resistance cell. $R_2$ represents the glass ceramic resistance of the cell placed between them. For the total resistance, $R_{sensor}$ of the temperature sensor or the iterative network the continued fraction applies:

$$R_{sensor} = R_1 + \cfrac{1}{\cfrac{1}{R_2} + \cfrac{1}{R_1 + \cfrac{1}{\cfrac{1}{R_2} + \cfrac{1}{R_1 + \cfrac{1}{\ddots + \cfrac{1}{R_1 + \cfrac{1}{\cfrac{1}{R_2} + \cfrac{1}{R_3}}}}}}}}$$

with: $R_1 = R_1(v)$
$R_2 = R_2(v)$
and $R_3 = R_1 + R_2$
or $R_3(v) = (R_2 + R_2)(v)$
$v$ = temperature If the surface resistance of both film resistors is small in comparison with the specific resistance of the glass ceramic at the maximum temperature of use of sensor ($R_1 \geq 0$), resistances $R_2$ are connected basically in parallel, as can be seen from the equivalent circuit in FIG. 6. This leads to a temperature resistance characteristic of the sensor, whose principle course agrees with the course of the temperature resistance characteristic of the glass ceramic in FIG. 1. The temperature resistance characteristic of the sensor for the case $R_1 \ll \rho(\theta)$ results approximately in:

$$R_{sensor}(\theta) = \rho(\theta) \cdot M$$

in which M represents a scaling factor determined by the geometry of the sensor. For the geometric shape of a sensor integrated in the cooking surface of a glass ceramic cooking area, which consists of an iterative circuit with two thin- and/or thick-film resistors run parallel, the same guidelines apply as for a sensor, consisting of an individual film resistor, of a parallel circuit. The essential areas of the surface to be monitored should be detected as completely as possible so that, also, this sensor in the area of a cooking zone is advantageously designed, corresponding to FIG. 4, as a star with several circular sectors.

Figure 7:
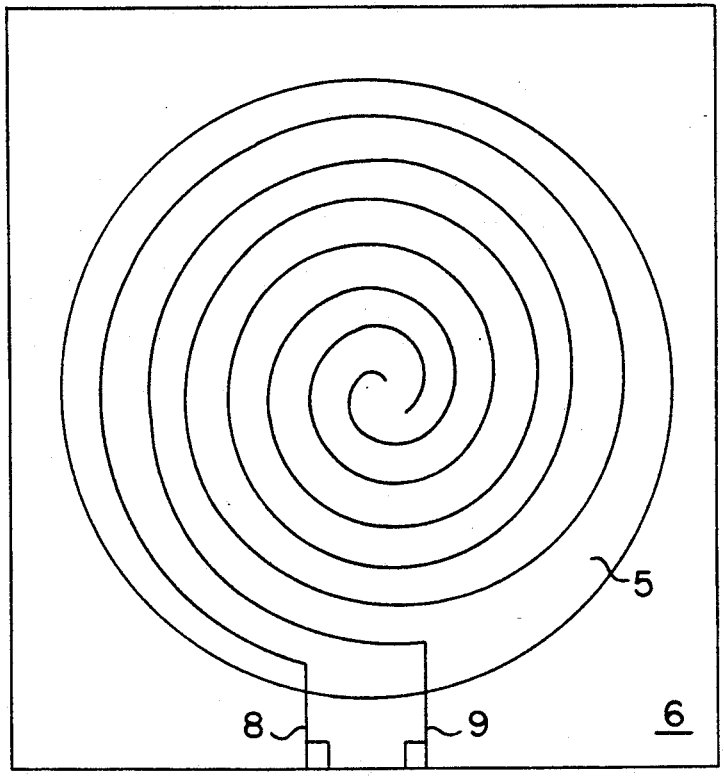
FIG. 7 two thin- and/or thick-film resistors, run in parallel in the area of a cooking zone, which are designed as double coils.

If the bonding thin- or thick-film resistors 8 and 9 are designed as double coil, as represented in FIG. 7, which is extended over entire cooking zone 5 of a glass ceramic cooking area 6, the sensor detects almost every overheated point of the cooking zone, but also detects a large portion of the entire surface of the cooking zone.

A sensor to control the temperature of the glass ceramic cooking surface in the area of the cooking zones, especially at "low" temperatures (less than 200° C.), and to protect the cooking zones from overheating is advantageously designed from two thin- and/or thick-film resistors run in parallel, which form an iterative network with the intervening glass ceramic, and one of the two strip-like film resistors is provided on its two ends with electric connecting contacts. The two film resistors are made, so that, on the one hand, the iterative network provides an exponentially temperature-limiting signal decreasing with the temperature, on the other hand, the film resistor bonded on both ends in the entire temperature area of use delivers a signal suitable for temperature control. By the separation of the temperature control and overheating protection, this arrangement offers the advantage of a greater operational safety relative to a simple parallel circuit, which is used both for temperature control and temperature limitation. Especially, the tasks of temperature control and temperature limitation are taken over by two electric switching circuits independent from one another.

Figure 8:
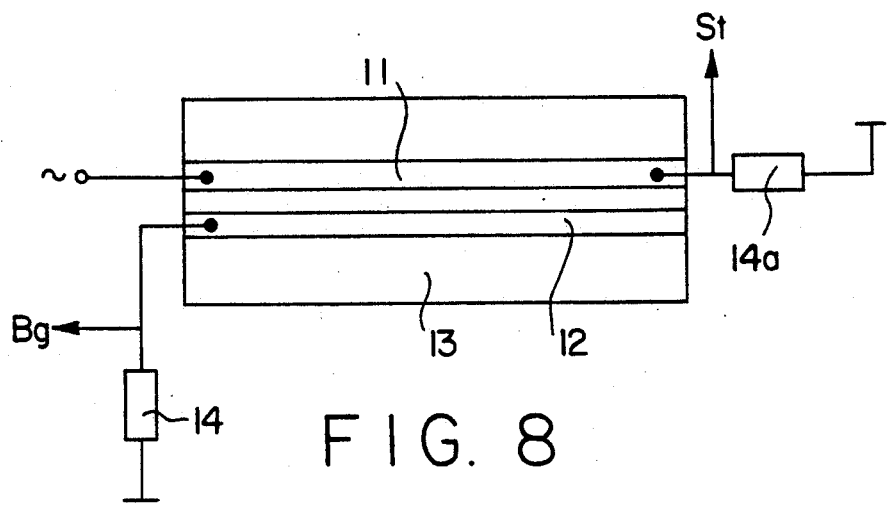
FIG. 8, a temperature sensor, which consists of two thin- and/or thick-film resistors provided with electric connecting contacts at three points.

The main circuit of this arrangement is seen in FIG. 8. Film resistors 11 and 12 delimit the glass ceramic resistance of the iterative network on glass ceramic surface 13. The threshold signal is picked up at film resistor 12. Low-ohmic film resistor 11, which preferably exhibits a linear temperature resistance characteristic with positive temperature coefficient, is bonded on its two ends and delivers to resistor 14a the control signal proportional to the temperature. By suitable dimensioning of resistances 14 and 14a, the two temperature resistance characteristics of the circuit are largely independent from one another.

If this sensor in the area of the cooking zone of a glass ceramic cooking surface is also designed as a star with several circular sectors, it detects all essential partial areas of the cooking zone and offers a sufficient overheating protection for the entire surface, and the average cooking zone temperature is controlled in proportion to the removal of heat by a superposed pot, beginning at room temperature.

To limit the temperature of a heated glass ceramic surface as a function of the temperatures on geometrically specified points of the glass ceramic surface, the two bonding thin- and/or thick-film resistors of an iterative circuit are actually placed basically parallel, but with changing distances from the glass ceramic surface, and the points of the smallest distance coincide with the specified temperature-measuring points. This temperature sensor delivers a signal, which basically is a function of the temperature of the specified measuring points. In this case, the measuring point with the highest temperature is determining or controlling for the total resistance of the sensor.

Figure 9:
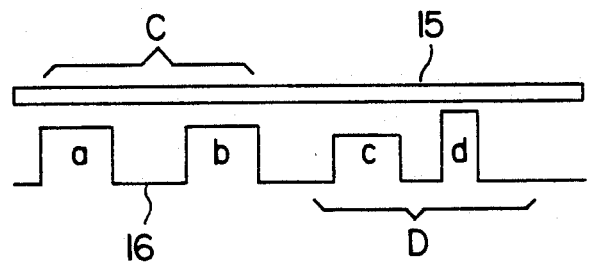
FIG. 9, an iterative network, in which to weight individual temperature-measuring points, the distance between the film resistors run in parallel varies locally.

FIG. 9 shows, by way of example in a simple configuration, the basic arrangement of the thin- and/or thick-film resistors, baked on the glass ceramic, for such a sensor.

A film resistor 15 designed as a simple line and a parallel meander-shaped film resistor 16 form the temperature measuring points at the points of greatest proximity. The principle is represented in FIG. 9 at C with points a and b. With distances that vary between the meander and the film resistor designed as a line, a local weighing of the measuring point temperature takes place. This is indicated in FIG. 9 at D with points c and d.

A local weighing of individual temperature measuring points can also be achieved in that at least one of two film resistors, allocated to one another, is designed as a sinusoid or triangular line, or as a line whose distance from the resistor running basically parallel according to a specified function of the surface to be monitored is determined by the respective temperature distribution.

Experience shows that the repairing of the sensors, integrated in the surfaces to be monitored, is not possible in the case of interruption of the bonding film resistors, since the original properties of the sensor in this case cannot be restored. For reasons of cost or for reasons of the simpler exchangeability of greatly stressed sensors, it is then more advisable to make sensors on their own glass ceramic supports separate from the heating surfaces to be monitored. These are then attached directly below the surface to be monitored and heated there by their radiation.

The glass ceramic supports can be designed both as surfaces and as rods with any cross section or as hollow bodies.

Preferably, such a sensor is designed as a "temperature-limiting rod." A temperature-limiting rod according to the invention consists of a rod-like support made from glass ceramic, with a round, oval or rectangular, preferably square, cross section, and the rod is bonded in rectangular cross section on two opposite sides over the entire surface, in oval or round cross section along two opposite lines with the film resistors. The limiting rod thus represents an iterative circuit.

The resistance of the bonding film resistors connected in series, in the total temperature area of use, is advantageously smaller than the resistance of the delimited support material at the maximum temperature of use of the sensor, so that the temperature resistance characteristic of the circuit is determined basically by the resistance of the glass ceramic. Relative to the iterative circuit, this means that resistance $R_1$ (FIG. 6), in the total temperature area of the limiting rod, is much smaller than glass ceramic resistance $R_2$.

Figure 10:
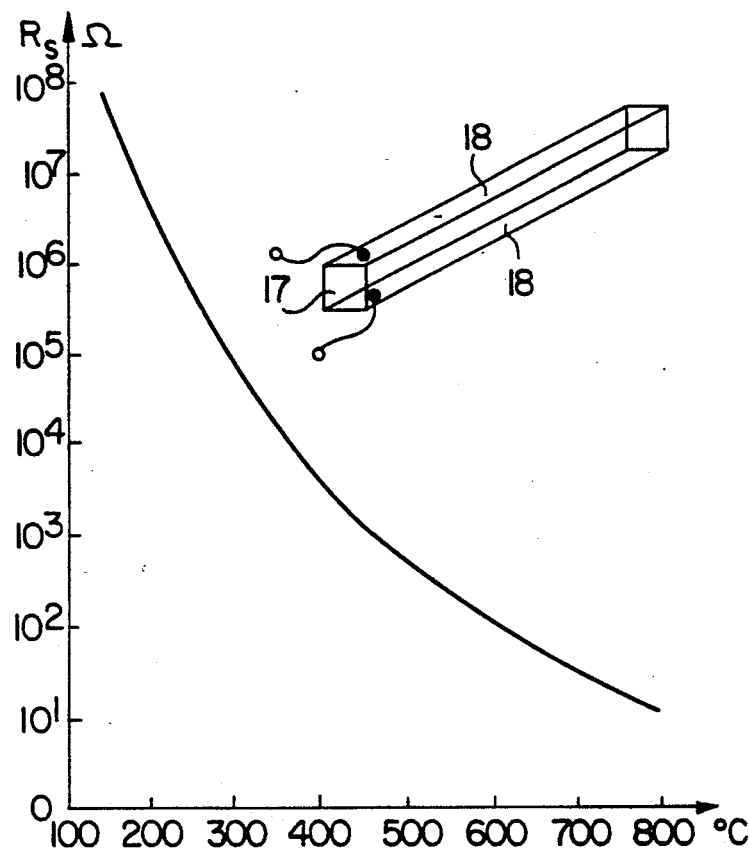
FIG. 10, a temperature-limiting rod according to the invention and its temperature resistance characteristic.

FIG. 10 shows a sensor, designed as "temperature-limiting rod" 17 for the cooking zones of glass ceramic cooking areas, with its temperature resistance characteristic. This characteristic applies for a rod with the following data:

Length of the heated zone: 160 mm

Cross section: $5 \times 10$ mm$^2$

Bonding film resistors 18: over the entire surface on two sides opposite one another, surface resistance $3 \cdot 10^{-3}$ $\Omega/\square$, temperature coefficient of the electrical resistance 0.0039 $\Omega/K$.

The rod is operated together with simple switching electronics (for example, a comparator) and is mounted in the same way in the heating elements of the cooking zones as the known protective temperature-limiting rods. It is heated like the latter both by the radiation of the cooking zone and by the radiation of the heating element. Because of the very close parallel circuit of the cell resistances of the sensor rod, the total resistance is determined by the smallest resistance of the hottest cell and is largely independent of the position of the hottest point of the sensor rod. A displacement of the switch point of the temperature limitation, as can be observed with the rod expansion sensors, designed as protective temperature limitation devices, according to the prior art by the apparent shortening of the sensor rod in the case of locally varying removal of heat, does not occur.

Figure 11:
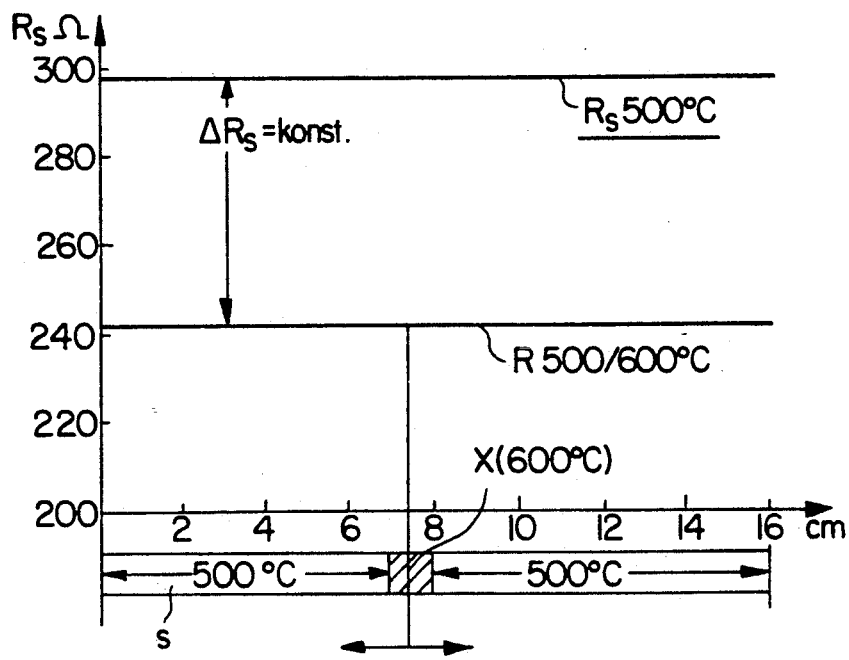
FIG. 11, the change of the total resistance of the temperature limiting rod in uneven heating.

In FIG. 11, the conditions in the case of uneven heating of temperature-limiting rod S are represented according to the invention. For this purpose, it is assumed that rod S in its entire length l, with the exception of a 1 cm wide area x, has assumed a temperature of 500° C. while the temperature of the excluded partial area is 600° C. The hotter partial area, as indicated below in FIG. 11, is displaced along the rod. Further, total resistance R of the sensor and its deviation $\Delta R$ is applied by resistor $R_2$ of the sensor, whose temperature is 500° C. over its entire length. This resistance deviation and the temperature signal deviation determined by it are almost independent of the site of the hottest point.

The geometric configuration and expansion of a sensor circuit over a heated surface depend on the type and geometry of the heating and the expected temperature distribution in practical operation. Often, it is advisable, instead of an individual sensor extended over large surfaces, which, for example, is to be used as a measuring element for a temperature limitation, to integrate several small sensors as a sensor arrangement in the surfaces to be monitored. This simultaneously offers the possibility of measuring temperature differences, such as also the approximate position of a maximum temperature in the heated surfaces. The low heat conduction of 2 to 3 W/mK of the glass ceramics assures in this case a relatively good thermal decoupling of the individual sensors.

Figure 12:
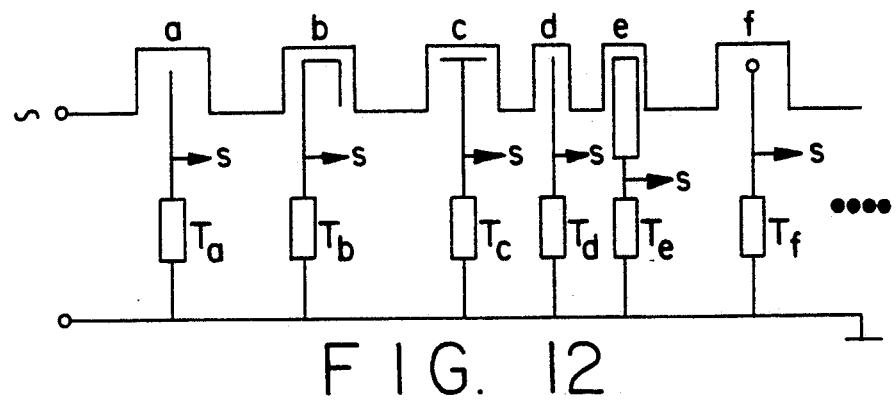
FIG. 12, a sensor arrangement according to the invention to determine the temperature profile along a line.

An arrangement of many temperature sensors, independent of one another, for example, to determine temperature profiles along a line, is represented in FIG. 12. This arrangement is baked on a strip-like glass ceramic support. Individual sensors a to f, etc., consisted of a basically meander-shaped thin- or thick-film resistor, which is common to all sensors, and many strip-like thin- and/or thick-film resistors, which project in the "cells" of the meander. The sensors are electrically mutually shielded by the meander. The temperature resistance characteristic of the individual sensors is determined individually by the geometry of the meander and the size of the surface resistances of the thin- and/or thick-film resistors, projecting in the meander, for each sensor of the arrangement.

Various examples of possible geometries can be seen from FIG. 12. To each sensor is allocated a potentiometer type resistance ($T_a$ to $T_f$, etc.), the signals are picked up at S.

Figure 13:
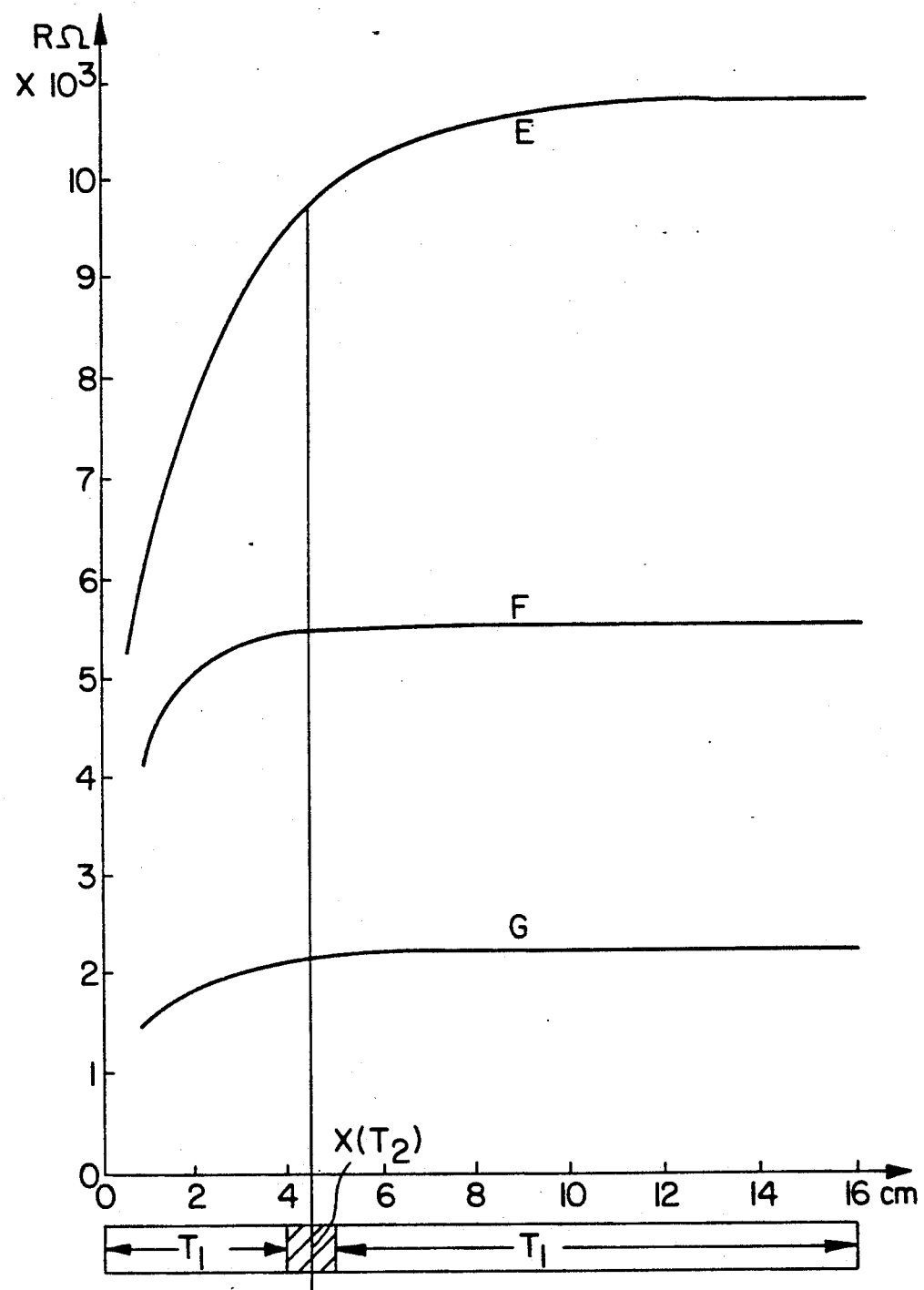
FIG. 13, the function of the total resistance of a specially made iterative network from the position of a "hot spot" on the iterative network.

A temperature sensor, whose signal amplitude is dependent on the position of the hottest point in the surface detected by the sensor, is again designed as an iterative network, and the total resistance of both thin- and/or thick-film resistors running parallel is larger than the electrical resistance, relative to the unit of length, of the glass ceramic at the maximum temperature of use, which is delimited and bonded by both film resistors on the glass ceramic support. FIG. 13 shows with curves E to G the dependence of the sensor resistance on the position of a 1 cm wide "hot spot," which is hotter by 100 K than the other sensor and which is displaced along the sensor, which is designed as a rod. Curves E and F belong to a sensor rod with the following data:

Glass ceramic rod with:
Length of rod: 160 mm
Width of rod: 10 mm
Thickness of rod: 5 mm
Specific resistance of the glass ceramic according to FIG. 1.
Bonding film resistors: $160 \times 10$ mm$^2$, surface resistance 1000 $\Omega/\square$; Temperature coefficient $T_k = 0.0039$ $\Omega/K$
Temperatures: Curve E: Hot Spot: $T_2 = 500°$ C., Other rod: $T_1 = 400°$ C. Curve F: Hot Spot: $T_2 = 600°$ C., Other rod: $T_1 = 500°$ C.
On curve G: Glass ceramic rod as above; surface resistance of the bonding resistors 100 $\Omega/\square$, $T_k = 0.0039$ $\Omega/K$. Hot Spot: $T_2 = 600°$ C., other rod: $T_1 = 500°$ C.

The transport of current in the glass ceramic takes place by ionic conduction. To avoid polarization phenomena and electrolytic decomposition, the sensors are to be operated only with alternating current, preferably at frequencies below 100 Hz.

The entire disclosures of all applications, patents and publications, cited above and below, and of corresponding application Federal Republic of Germany P 40 22 845.2-52, filed Jul. 18, 1990, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A temperature sensor or temperature sensor arrangement made from glass ceramic and bonding film resistors, utilized specifically for control and/or limitation of output in glass ceramic cooking surfaces of cooktop stoves, comprising at least one strip-like metal or metal oxide thin- or thick-film resistor, designed as a temperature-measuring resistor, on a support made from glass ceramic, which is provided on both ends with electric connecting contacts and forms a parallel circuit with the electrical resistance of the surrounding glass ceramic, whose temperature resistance characteristic is determined by the superposition of the temperature resistance characteristics of the individual resistors, by the resistance values of the individual resistors as well as by their geometry, wherein the film resistance corresponds to the electrical resistance of the glass ceramic connected in parallel at a selected temperature within the temperature range of use, so that the temperature resistance characteristic of the circuit is determined below selected temperature by the film resistor and above the selected temperature by the glass ceramic resistance decreasing exponentially with the actual temperature.

2. A temperature sensor or temperature sensor arrangement according to claim 1, wherein the thin- or thick-film resistors consist of a material with positive temperature coefficients of the electrical resistance.

3. A temperature sensor or temperature sensor arrangement according to claim 1, wherein the bonding thin-film resistors are metal layers comprised of a metal selected from the group consisting of Au, Ag, Pt, Pd, Au/Ag, Au/Pt, Ag/Pd and Au/Pt/Pd.

4. A temperature sensor or temperature sensor arrangement according to claim 1, wherein the bonding thick-film resistors are comprised of a material selected from the group consisting of Au, Ag, Pt, Pd, Au/Ag, Au/Pt, Ag/Pd, Au/Pt/Pd, RuO$_2$, Rh$_2$O$_3$, IrO$_2$, OsO$_2$ and TiO$_2$.

5. A temperature sensor or temperature sensor arrangement according to claim 1, wherein the bonding film resistors of a sensor circuit or all sensor circuits on a support consist essentially of the same material and either are all designed as thin-film resistors or are all designed as thick-film resistors.

6. A temperature sensor or temperature sensor arrangement according to claim 1, wherein the bonding film resistors of a sensor circuit or all sensor circuits on a support are made from different materials and are configured as thin- and/or thick-film resistors.

7. A temperature sensor or temperature sensor arrangement according to claim 1, wherein the bonding film resistors in their connecting areas are reinforced by layers of a metal selected from the group consisting of Ag, Ag/Pd, Au and Au/Pt/Pd and carry electric contacts, which are attached to the reinforced connecting areas with solder.

8. A temperature sensor or temperature sensor arrangement according to claim 1, wherein the film resistors are baked on the surface of a cooking zone of the glass ceramic cooking surfaces.

9. A temperature sensor or temperature sensor arrangement according to claim 8, wherein the film resistors in the surface of a cooking zone have a shape which is matched to an expected temperature distribution of the glass ceramic cooking surfaces.

10. A temperature sensor or temperature sensor arrangement according to claim 9, wherein an individual film resistor of a parallel circuit or two parallel film resistors of an iterative circuit in the surface of the ceramic cooking surfaces are configured as a star with several circular sectors.

11. A temperature sensor or temperature sensor arrangement according to claim 9, wherein two parallel strip-like resistors of an iterative circuit in the surface of the ceramic cooking surfaces are configured as double coils.

12. A temperature sensor or temperature sensor arrangement made from glass ceramic of a selected resistance and bonding film resistors, suitable for control and/or limitation of output in glass ceramic cooking areas, comprising strip-like thin- and/or thick-film resistors, spaced a selected distance apart and allocated to one another in pairs, the film resistors being made from a metal and/or metal oxide and being bonded on a support made of glass ceramic to delimit and partial areas, the film resistors being connected as two basically parallel film resistors allocated to one another to form in each case an iterative circuit with the electrical resistance of the glass ceramic, the temperature resistance characteristic of the circuit being determined by the superposition of the temperature resistance characteristics of the individual film and glass ceramic resistors, the resistance values of the individual film and glass ceramic resistors and the geometric arrangement of the film and glass ceramic resistors.

13. A temperature sensor or temperature sensor arrangement according to claim 12, wherein the resistance of the film resistors connected in series is greater, relative to the length thereof, than the electrical resistance of the glass ceramic delimited by the two film resistors at the maximum temperature of use of the sensor, whereby the temperature resistance characteristics are a function of the position of a "hot spot" on the sensor.

14. A temperature sensor or temperature sensor arrangement according to claim 12, wherein at least one of two film resistors, allocated to one another, on both ends is provided with electric connecting contacts and is connected in parallel to the glass ceramic adjacent thereto, and forms a measuring resistor substantially independent of the iterative circuit associated therewith.

15. A temperature sensor or temperature sensor arrangement according to claim 14, wherein the film resistor is provided with electrical connecting elements at both ends and is in the whole temperature range of use substantially lower in resistance than the resistance of the glass ceramic adjacent thereto during maximum temperature of use of the sensor, so that the temperature resistance characteristics of the parallel circuit in the whole temperature range of use of the sensor is determined primarily by the film resistor.

16. A temperature sensor or temperature sensor arrangement according to claim 12, wherein for local temperature measurement, the distance between two film resistors allocated to one another varies locally, so that total resistance of the iterative circuit formed by the two film resistors and the resistance of the glass ceramic therebetween is determined primarily by the glass ceramic resistance in areas with the smallest distance between bonding film resistors.

17. A temperature sensor or temperature sensor arrangement of claim 16 wherein one of the two basically parallel film resistors has a selected shape which undulates with respect to the other film resistor and is spaced a distance from the other film resistor, and wherein the distance is determined according to a function specified by the respective temperature distribution of the glass ceramic cooking areas to be monitored.

18. A temperature sensor or temperature sensor arrangement of claim 17 wherein said one of the two film resistors is configured in a meandering shape.

19. The temperature sensor or sensor arrangement of claim 17 wherein said one of the two film resistors is configured as a sinusoid.

20. The temperature sensor or sensor arragement of claim 17 wherein said one of the two film resistors is configured as a line with a triangular-shaped geometry.

21. A temperature sensor or temperature sensor arrangement according to claim 12 formed as a temperature-limiting rod for glass ceramic cooking surfaces, wherein the support made from glass ceramic is formed as a rod and is bonded on opposite sides thereof to the film resistors.

22. A temperature sensor or temperature sensor arrangement according to claim 21, wherein the resistance of the bonding film resistors, connected in series, in a whole temperature range of use is lower than the resistance of the delimited support material at a maximum temperature of use of the sensor, so that the temperature resistance characteristic of the circuit in the whole temperature range of use is determined primarily by the glass ceramic resistance.

23. A temperature sensing arrangement in combination with and used specifically for controlling glass ceramic cooking surfaces of cooktop stoves, the arrangement comprising:
a support of glass ceramic material having a selected electrical resistance; and
a film type resistor means having a selected film resistance mounted on the support of glass ceramic material, the film type resistor means having electrical contacts at opposite ends thereof and forming a parallel resistance circuit with the resistance inherent in the glass ceramic support, the resistance of the film type resistor and the glass ceramic material being such that the resistance of the film type resistor means has substantially the same rate of increase as the electrical resistance of the glass ceramic material within a temperature range corresponding to the temperature range of typical use by the glass ceramic heating area thus providing a temperature resistance characteristic of the parallel circuit determined by the film type resistor means and the temperature resistance characteristic of the parallel circuit above the temperature range of typical use is determined by an exponential decrease in the resistance of the glass ceramic material.

24. The temperature sensing arrangement of claim 23, wherein the film type resistor means is comprised of a pair of film resistors connected in parallel to the support of the glass ceramic material.

25. A temperature sensor arrangement comprising first and second film-type resistors extending parallel with respect to one another on a glass ceramic cooking surface; the first resistor being supplied with alternating current and having a meandering configuration defining indented areas with respect to the other resistor to provide a plurality of cells; the second resistor including a plurality of sensors received in the cells, the sensors each being film-type resistors and each being electrically shielded by the meandering configuration of the first resistor; each sensor being allocated a potentiometer type resistance having signals individually monitored.

26. The temperature sensor of claim 25 wherein the resistors are thin-film resistors.

27. The temperature sensor of claim 25 wherein the resistors are thick-film resistors.

28. The temperature sensor arrangement of claim 25 wherein sensors each have individual temperature sensing characteristics determined individually by the geometry of the meandering configuration and the amount of the surface resistance of the sensors.

* * * * *